United States Patent [19]

Gottschalk et al.

[11] Patent Number: 5,403,031
[45] Date of Patent: Apr. 4, 1995

[54] PARALLELOGRAM LIFT AXLE SUSPENSION SYSTEM WITH A CONTROL FOR AXLE CASTER ADJUSTMENT

[75] Inventors: Michael J. Gottschalk, New Philadelpha; Michael J. Keeler, Canton, both of Ohio

[73] Assignee: The Boler Company, Itasca, Ill.

[21] Appl. No.: 162,939

[22] Filed: Dec. 8, 1993

[51] Int. Cl.$^6$ ................................. B60G 11/26
[52] U.S. Cl. ....................... 280/704; 280/661; 280/711
[58] Field of Search ............. 280/704, 711, 713, 81.6, 280/661; 180/204

[56] References Cited

U.S. PATENT DOCUMENTS

| | | |
|---|---|---|
| 3,510,149 | 5/1970 | Raidel . |
| 3,771,812 | 11/1973 | Pierce et al. . |
| 3,861,708 | 1/1975 | Fier . |
| 3,902,734 | 9/1975 | Fier . |
| 3,904,220 | 9/1975 | Fier . |
| 4,792,148 | 12/1988 | Hintz ................... 280/704 |
| 4,881,747 | 11/1989 | Raidel ................. 280/81.6 |
| 5,015,004 | 5/1991 | Mitchell .............. 280/81.6 |
| 5,018,756 | 5/1991 | Mitchell .............. 280/81.6 |
| 5,058,916 | 10/1991 | Hicks ................... 280/704 |

Primary Examiner—Kenneth R. Rice
Attorney, Agent, or Firm—Myers, Liniak & Berenato

[57] ABSTRACT

A twin beam parallelogram-type lift axle suspension system includes a bi-directional airlift spring having opposite end plates at either end thereof located between two parallel control arms wherein expansion of the air spring pivots the upper and lower control arms with respect to a frame bracket thereby lifting an axle and wheels attached thereto from engagement with the road surface. The end plates of the bi-directional air spring move about equally in opposite directions and remain substantially parallel to one another throughout expansion and contraction of the air spring so as to about equally distribute forces of expansion of the air spring between the upper and lower control arms. The system of the instant invention also includes a shock absorber having one end attached to the upper control arm and another end attached to the lower control arm so as to locate the shock absorber forward of the axle thereby minimizing shock travel and maximizing shock life. The upper control arm is pivotally connected to an axle seat by a bolt including an eccentric cam mechanism which allows one to adjust the caster angle of the axle when the need arises.

32 Claims, 6 Drawing Sheets

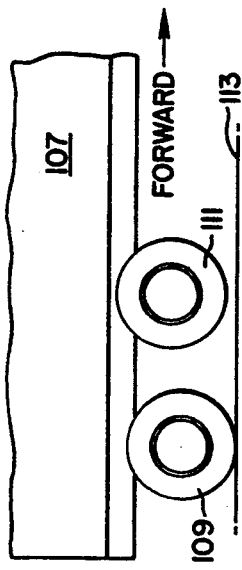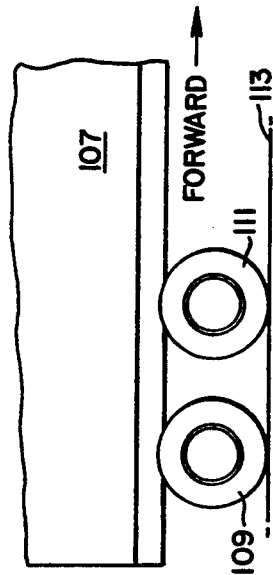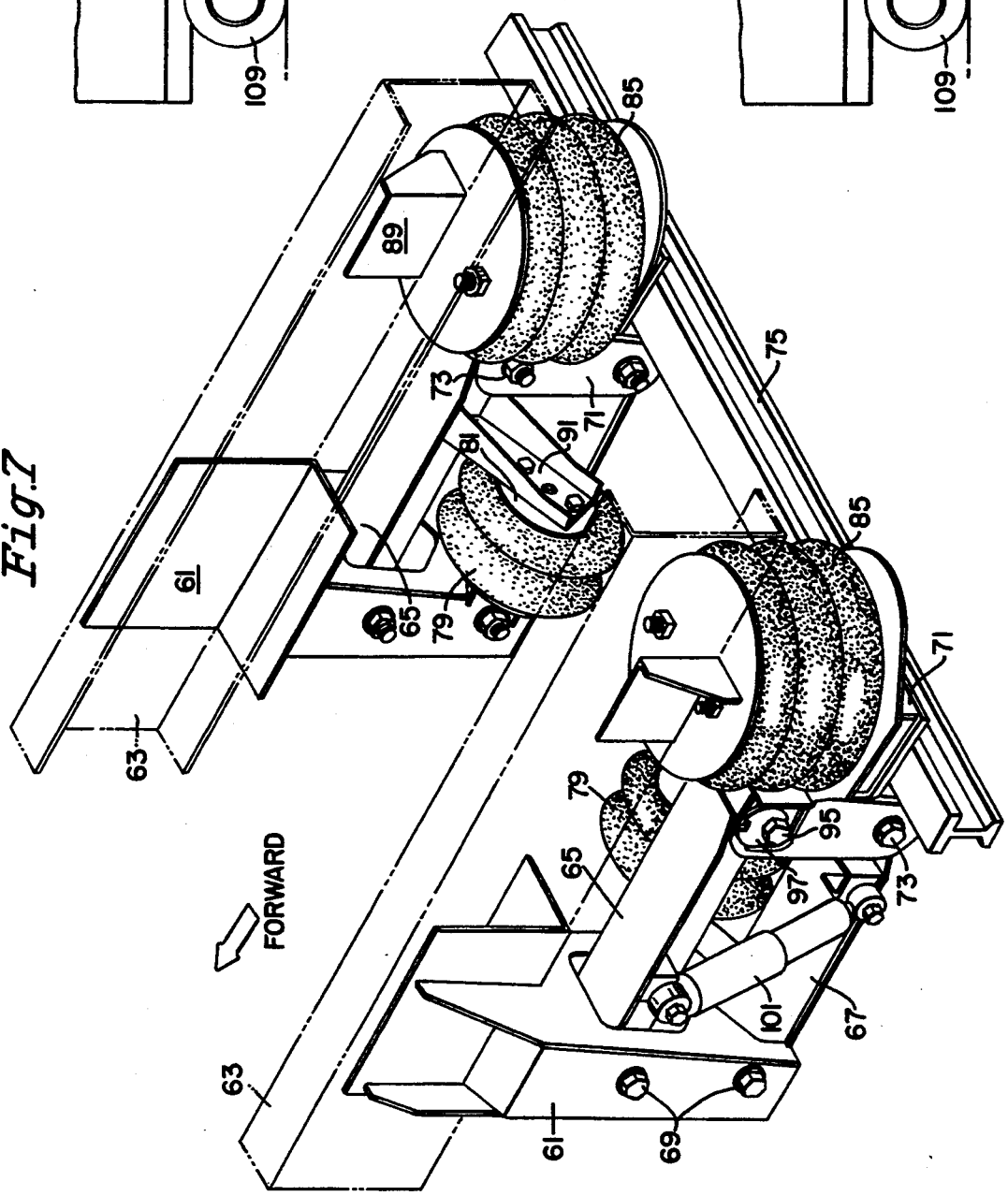

PARALLELOGRAM LIFT AXLE SUSPENSION SYSTEM WITH A CONTROL FOR AXLE CASTER ADJUSTMENT

This application relates to auxiliary axle suspension systems for wheeled vehicles. More specifically, this application relates to auxiliary lift axle suspension systems of improved compactness and durability.

BACKGROUND OF THE INVENTION

In wheeled vehicle axle suspension systems, it is often desirable to have a lifting feature that lifts the wheels of the system from road engagement when their load carrying capabilities are not needed. The liftable axles are lifted when operating the wheeled vehicle in a lightly loaded or empty condition and lowered when the vehicle is loaded sufficiently to require an extra axle for safety or to conform to highway weight laws.

In suspension systems for trailing axles and pusher axles, it is known that if a steerable axle is installed with the proper pitch or caster angle, the drag of the wheels will cause the axle to steer automatically in response to steering of the vehicle. This is referred to as a self-steering suspension system. It is also known in the art to provide a parallelogram arrangement of control arms or torque rods connected between a frame hanger bracket and an axle seat to maintain a substantially constant pitch of the axle and to provide lift mechanisms for such suspensions.

Many devices have been used to lift axle suspensions in the past. FIGS. 1-2 are exemplary illustrations of such devices.

FIG. 1 depicts a conventional twin beam lift axle suspension which includes an air bellows 9 which angularly expands thereby raising trailing arm 21 and axle 7 attached thereto. This raising of the axle lifts the wheels of the system from engagement with the road surface. An appendage 19 is connected to trailing arm 21, and when the air bellows is expanded or contracted the trailing arm 21 is pivotally rotated about a resilient member 23 which defines a pivot point. The air bellows 9 (or airlift spring) is attached at one end 25 to the appendage 19, with the other end 27 being attached to the fixedly mounted frame hanger bracket 29. When the air bellows 9 is inflated, it reacts against the frame bracket 29 and the beam appendage 19 causing the trailing arm 21 to move relative to the bracket 29 about the pivot point defined by the resilient member 23. This expansion of the airlift spring causes the trailing arm and axle 7 to be raised and the wheels of the system to be lifted from road engagement. When the airlift spring is deflated, the axle and wheels attached thereto are lowered into engagement with the road surface.

This design is not without its limitations. During lifting, the air bellows 9 is articulated through an angle due to the geometry of the suspension. This angular expansion of the air bellows is sometimes referred to as an "accordion effect". The angle from parallel typically should not exceed 25° due to restrictions in the air spring construction. Due to this accordion effect, the effectiveness and lifting capabilities of the air bellows are limited and maintenance requirements are increased, as more fully discussed below.

The air bellows 9 in this design is typically located within the frame hanger bracket 29 of the suspension. Due to the size and angular expansion of the air spring, the frame bracket 29 must be of a size larger than is otherwise necessary, thus adding to the cost and weight of the suspension. Another problem with the angular expansion of the air spring in this system is that the air spring undergoes added wear and tear due to the non-symmetric nature of the angular expansion (i.e. the "accordion effect"). In this respect, the upper side of the air spring 9 shown in FIG. 1 realizes higher stresses than the lower side due to stretching of the spring resulting from the accordian effect. Accordingly, because of the accordian effect, increased maintenance is required in more frequently replacing the air springs, which could be avoided if the air springs were to be expanded in a uniform symmetrical manner keeping the end plates 25 and 27 substantially parallel at all times during articulation of the air spring.

Furthermore, as can be seen in FIG. 1, the air spring or bellows 9 has one end 27 fixedly attached to fixed frame bracket 29 resulting in a uni-directional expansion of the bellows 9. Accordingly, during the uni-directional expansion of the bellows 9, the one end 27 remains fixed while the other end 25 moves to the left as shown in FIG. 1, thus driving appendage 19 and arm 21. As a result, substantially 100% of the expansion forces exerted by bellows 9 are directed toward appendage 19 and arm 21 thus requiring arm 21 to be of a size large enough to continually withstand 100% of the expansion forces of bellows 9.

There has also been a development of another type of suspension for special applications that may be referred to as a "parallelogram" lift axle suspension. An example of this type of lift axle suspension is shown in FIG. 2a and 2b. The parallelogram lift axle suspension is used primarily, but not exclusively, in steerable type lift axle suspension systems which are self-steering. The self-steering results from the liftable axle 39 being installed with the proper caster or pitch and the drag of the wheels attached to the axle causing the axle to steer automatically in response to steering of the vehicle.

The reason for the popularity of the parallelogram suspension is its ability to keep the caster (i.e. angular relationship of the axle 39 relative to the ground or the horizontal) or pitch of the axle relatively constant through vertical articulation of the axle. In other words, as the axle 39 and wheels (not shown) attached thereto are lowered or raised to or from engagement with the road surface, the caster angle (or pitch) of the axle 39 remains substantially constant.

The parallelogram lift axle suspension system shown in FIGS. 2a and 2b is typical for the industry and includes an uni-direction expanding air bellows 47, a downwardly extending frame hanger bracket 31, a lower trailing beam 33, an upper control arm 35, and an axle seat 37 connected to the axle 39. Uni-directional expansion of the air bellows 47 causes the beam 33 and arm 35 to pivot upward and lift the axle and wheels attached thereto from road engagement. Castor or pitch remains substantially constant throughout the axles raising and lowering due to the parallelogram design.

The uni-directional expansion results from end plate 51 of bellows 47 being attached to fixed hanger bracket 31. Accordingly, when bellows 47 is expanded [i.e. FIG. 2a], end plate 51 remains fixed while end plate 49 is moved to the left as shown in FIG. 2 thereby driving beam 33 and raising the axle 39 from engagement with the road surface.

The lower trailing beam 33 is pivotally attached to the frame bracket 31 at one end and pivotally attached to the axle seat 37 at the other end. The upper control arm 35 of this conventional lift axle suspension is pivotally attached to both the frame bracket 31 and the axle seat 37 at pivot points 38. The frame bracket 31, lower trailing beam 33, axle seat 37, and upper control arm 35 are all pivotally connected to form the parallelogram 5 that allows the axle 39 to have relatively constant caster or pitch throughout its vertical articulation.

In a fashion similar to that of the system illustrated in FIG. 1, the air bellows 47 of FIGS. 2a-2b undergoes an accordian effect during expansion and contraction (shown in FIG. 2b). Of course, as discussed above, one end 51 of bellows 47 is attached to fixed frame bracket 31 and the other end 49 attached to appendage 43. This results in the uni-directional expansion of bellows 47. The movement of lower arm 33, resulting from bellows 47 being expanded and contracted, necessarily causes upper arm 35 to pivot simultaneously due to the linking of the upper and lower arms via axle seat 37. Because substantially all of the expansion forces of lifting bellows 47 are directed toward the lower arm 33 via elements 41 and 43, the lower arm 33 must be large enough so as to safely transmit all of such expansion forces.

The system of FIGS. 2a-2b is exemplary of several known parallelogram lift systems. Typically, such parallelogram type suspensions provides more lift height capability than a standard twin beam lift. In the design of the parallelogram system of FIGS. 2a and 2b, for example, the appendage 41 is attached to the lower trailing beam or control arm 33 and an intermediate bracket 43 is pivotally attached to the appendage at a pivot point 45. The air spring or air bellows 47 is attached at one end to the intermediate bracket 43 and at the other end to the frame bracket 31. The twin beam lift system (e.g. FIG. 1) lowers and raises its beams in a similar fashion, except it has no counterpart to the intermediate bracket 43 and the appendage 41 in a parallelogram suspension which allow more lift before the angular capabilities of the lift air spring 47 are exceeded. This is because the addition of the intermediate bracket and the appendage allows the bellows 47 to undergo less of an accordian effect than that of FIG. 1 throughout expansion and contraction. Nevertheless, the accordian affect is not entirely eliminated.

A disadvantage of the parallelogram type lift system shown in FIGS. 2a and 2b over that shown in FIG. 1 arises from the necessity to employ added pivot point 45 to join appendage 41 to intermediate bracket 43. Once again, as well, the uni-directional expansion/contraction of bellows 47 must be taken into account in the design. For example, the addition of pivot point 45 adds a potential wear point to the suspension and thus increases maintenance requirements. This disadvantage cannot be eliminated because pivot point 45 is needed.

The resulting uni-directional expansion of bellows 47, of course, gives rise to the need for a substantially large lower control arm 33 and a fairly large expansion bellows 47.

One variation of the parallelogram lift axle suspension shown in FIGS. 2a and 2b utilizes a turn buckle (not shown) adjustment mechanism, including multiple fasteners, in the upper control arm 35 which is used to effectually adjust the length of the upper control arm and therefore adjust the caster angle of the axle 39 through tilting of the axle seat. This allows for the caster (or pitch) of the axle to be changed as needed. For example, a truck heavily loaded in the rearward portion thereof has its rear end closer to the road surface than would an empty truck, because as additional weight is added to the rear section of the trailer, the truck is forced downward at its rear section and closer to the road surface. This changes the preferred caster of the axle and creates a need for caster adjustment.

The disadvantage of the turn buckle adjustment mechanism described above is that the number of fasteners on the upper control arm is increased by about four thereby increasing the number of fasteners which must be torqued and maintained.

The parallelogram lift axle suspension system illustrated in FIGS. 2a and 2b also includes a shock absorber 53 mounted to appendage 57 and to the frame of the vehicle via a shock mount 55. Often, it is desirable to install shock absorbers on the parallelogram suspension 50 so as to dampen vibration of the axle and the control arms. FIGS. 2a and 2b show a typical shock absorber installation where appendage 57 extends from the rear of the axle 39 with the lower end of the shock absorber 53 being connected to the appendage 57 and the upper end of the shock absorber being connected to the upper shock mount 55.

The disadvantages of this type of shock absorber installation are as follows. The upper shock mount must be installed by the installer of the suspension and the presence of the appendage 57 is required. The location of the shock absorber 53 shown in FIG. 2, rearward of the axle 39, is not ideal and causes the shock absorber to wear faster than desirable. Furthermore, the location of the shock absorber 53 shown in FIG. 2 requires substantial space below the vehicle chassis that may not always be available on certain kinds of vehicles.

U.S. Pat. No. 5,018,756 discloses a suspension system in which a uni-directional airlift spring (or air bellows) angularly expands and contracts thereby undergoing an accordion effect. This reduces the effectiveness and lifting capabilities of the air spring as discussed above. This patent does not disclose or suggest how one could eliminate the uni-directional angular expansion and contraction of the bellows.

U.S. Pat. No. 3,861,708 teaches the use of uni-directional expanding and contracting air bellows or air springs to lower and raise an axle in the context of a lift axle suspension system. This patent teaches the advantage of avoiding an accordion effect by locating the center of gravity of the element to be moved as close to the longitudinal axis of the air bellows as possible. However, the uni-directional expanding air springs of this patent are not used in conjunction with a twin beam parallelogram type lift axle suspension.

It is apparent from the above that there exists a need in the art for a better means for lifting the axles in parallelogram type axle suspensions that would reduce costs and weight, provide for a bi-directional expansion and contraction of the bellows, reduce the relative sizes of the lower control arms and air bellows, increase lift capabilities, and reduce maintenance. It is also apparent that there exists a further need in the art to provide a simpler caster angle adjustment mechanism and a more efficient shock absorber installation means that would be more cost effective, durable, and provide for decreased maintenance requirements.

SUMMARY OF THE INVENTION

This invention fulfills the above-described needs in the art by providing in a wheel bearing lift axle suspension for a wheeled vehicle which includes at least two non-liftable wheel bearing suspensions providing the primary means of support for road engagement of the vehicle, the lift axle suspension system comprising a frame bracket, upper and lower control arms having first ends pivotally attached to the frame bracket at pivot points and second ends attached to an axle connection means, and means for raising and lowering the wheels of the lift axle suspension into and out of engagement with the road surface, the improvement comprising: the means for raising the wheels out of engagement with the road surface including bi-directional expansion and contraction means having first and second ends defined by a plate means at each end, the plate means being attached to the control arms in such a manner and being so located such that when the bi-directional means are expanded and contracted the plate means remain substantially parallel, one with respect to the other, when the wheels of the lift axle suspension are lowered into and lifted out of engagement with the road surface.

In certain preferred embodiments the bi-directional means are expandable and retractable air bellows operated off of the air system of the vehicle. In still further embodiments the means for lowering the wheels of said suspension into road engagement includes another air bellows means, which upon expansion and deflation of the lifting air bellows, lowers the wheels into road engagement.

This invention also fulfills the above described needs in the art by providing an axle suspension system for a wheeled vehicle, comprising: a downwardly extending frame bracket; upper and lower control arms each having first and second ends, and wherein the first ends of the upper and lower control arms are pivotally attached to the frame bracket; an axle connection means attached to the second ends of the upper and lower control arms; means for simultaneously pivoting the upper and lower control arms with respect to the frame bracket thereby raising and lowering the axle connection means; and a shock absorber having first and second ends, wherein the first end is attached to the upper control arm and the second end is attached to the lower control arm.

In certain preferred embodiments, the means for simultaneously pivoting the control arms comprises a bi-directional expanding and contracting air bellows having first and second ends each defined by a plate means, wherein the plate means remain substantially parallel to one another during bi-directional expansion and contraction of the air bellows.

This invention further fulfills the above-described needs in the art by providing an axle suspension system for a wheeled vehicle, comprising: upper and lower control arms which move in conjunction with one another thereby raising and lowering an axle seat; one of the control arms being connected to the axle seat by an eccentric cam; and wherein the eccentric cam includes a means for changing the caster angle of an axle to be attached to the axle seat.

In certain further preferred embodiments, the air bellows are attached to said control arms through at least two appendages which are fixedly connected to both the control arms and air bellows, and wherein the control arms have a triangular cross-sectional shape and are pivotally connected to both the axle seat and the frame bracket and the upper and lower control arms remain substantially parallel to one another during expansion and contraction of the air bellows.

In still further preferred embodiments of this invention, the eccentric cam is attached to a bolt wherein the bolt is slidably mounted in a slot formed in the axle seat and the means for changing the caster angle includes opposing cam contact members located on respective sides of the cam.

In further preferred embodiments, the shock absorber is pivotally attached to the upper and lower control arms, and the appendages connecting the control arms to the expansion means include a planar surface attached to both of: a) one of the expansion end plates; and b) one of the control arms; and wherein each of the end plates of the expansion means expand a substantially equal distance in their respective longitudinal directions.

This invention will now be described with respect to certain embodiments thereof as illustrated in the following drawings:

IN THE DRAWINGS

FIG. 7 is a three dimensional view of the second embodiment; and

FIGS. 8a and 8b are side plan views of a typical truck employing the auxiliary lift suspensions of this invention.

DETAILED DESCRIPTION OF CERTAIN EMBODIMENTS

Figure 1:
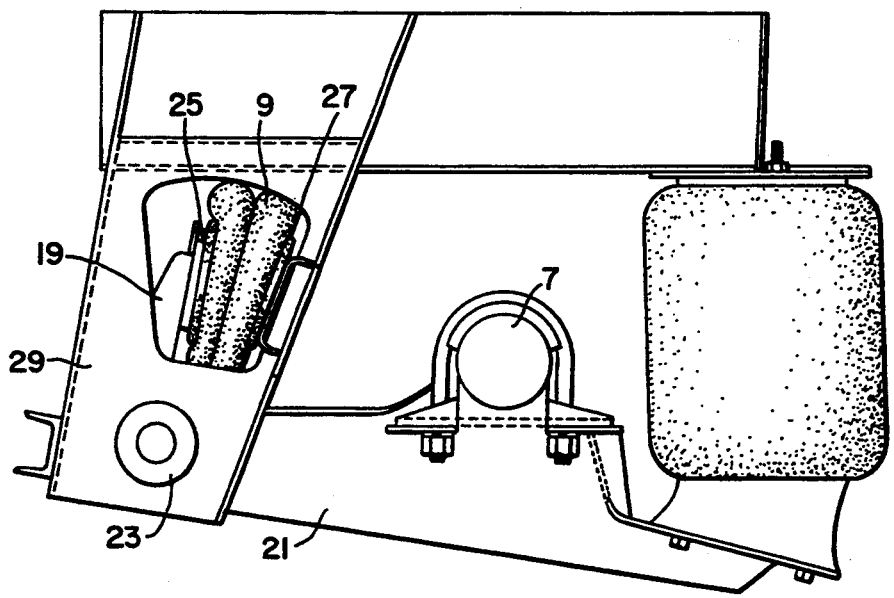
FIG. 1 is a side plan, partially sectionalized view of a first prior art lift axle suspension system.
Figure 2A:
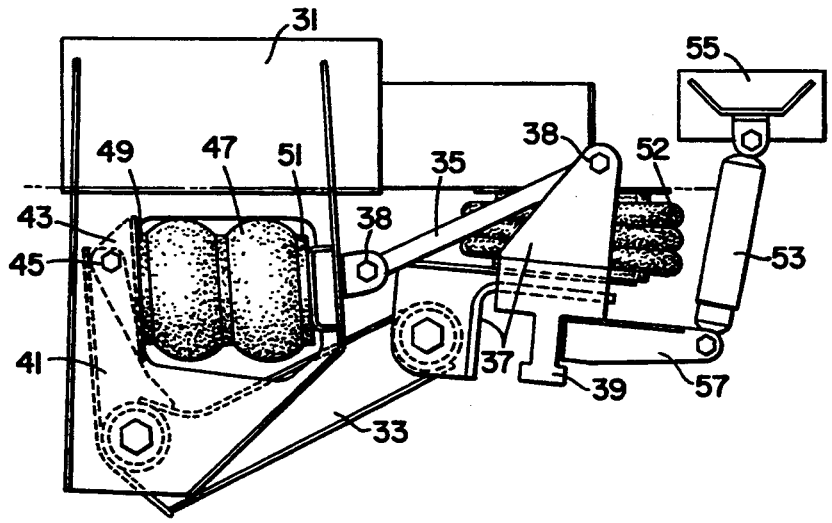
FIGS. 2a and 2b are side plan, partially sectionalized views of a second prior art lift axle suspension system.
Figure 2B:
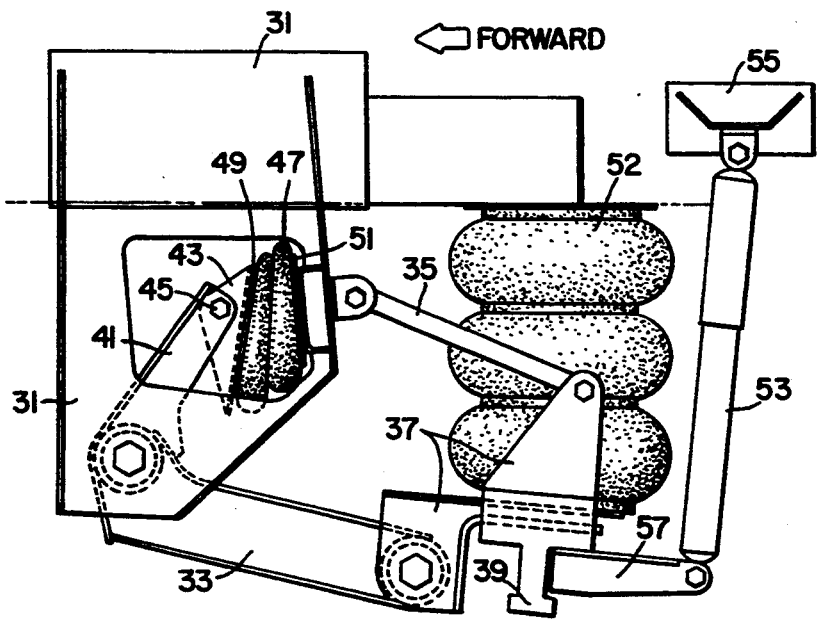
Figure 3A:
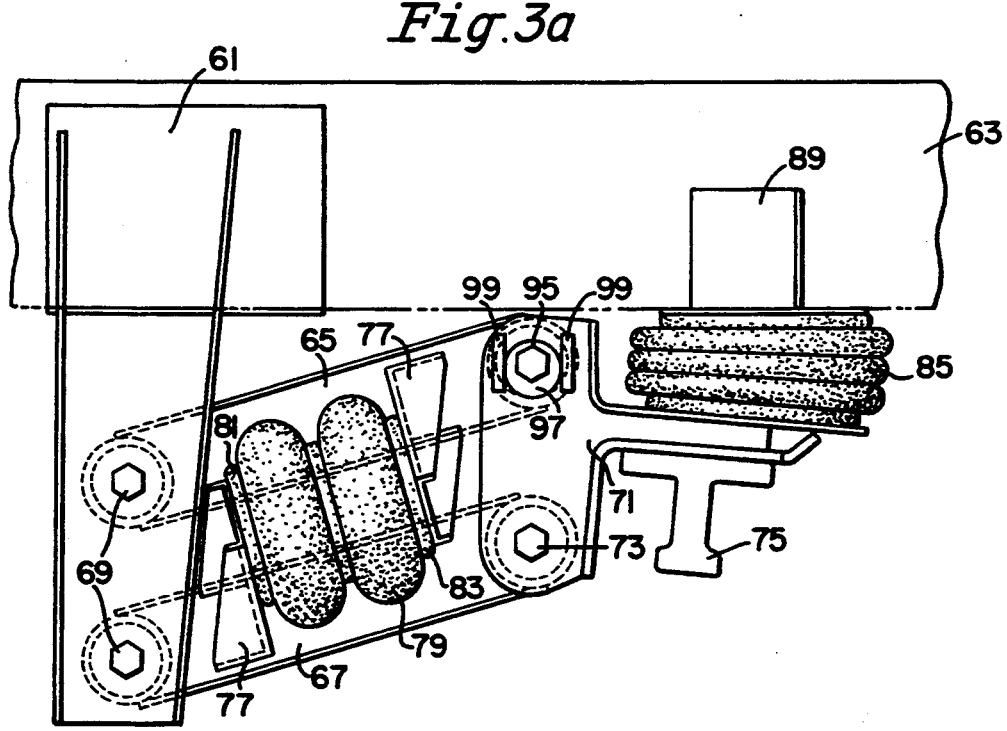
FIGS. 3a and 3b are side plan, partially sectionalized views of a first embodiment of this invention.
Figure 3B:
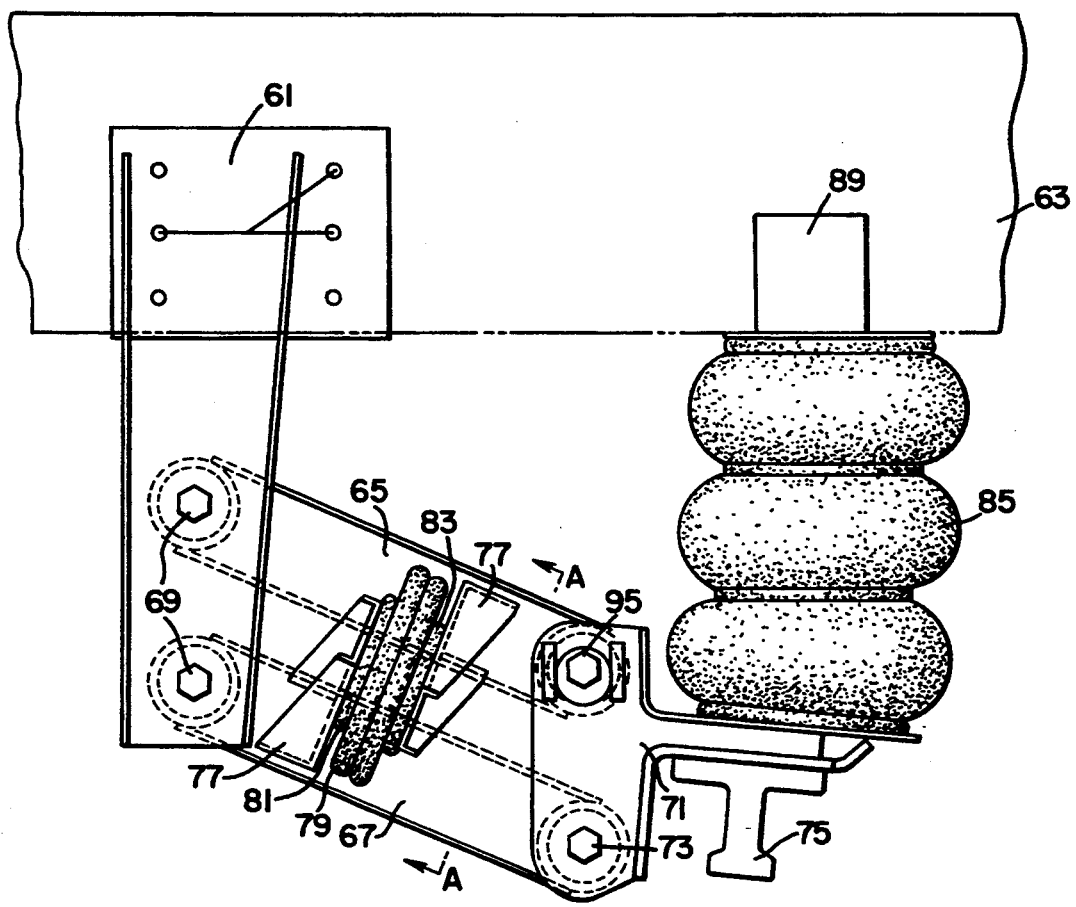

FIG. 3a shows a first embodiment of the lift axle suspension of the present invention in the lifted position wherein the wheels (not shown) attached to the axle 75 are lifted out of engagement with the road surface. FIG. 3B illustrates the lift axle suspension in the full rebound or lowered position where the wheels (not shown) attached to the axle 75 are in contact with the road surface.

The mechanisms and controls for inflating and deflating air bellows employed as lifting and/or lowering means are well-known and conventional in the art. They consist of various air lines connecting the air from the air brake and air compression means with the bellows, and a control mechanism located in the cab of the vehicle for operation by the driver.

As shown in FIGS. 3a and 3b, one side of an embodiment of a lift axle suspension according to this invention includes a downwardly extending frame bracket 61 that is attached to a frame member 63 of the vehicle. It is, of course, understood that only one-half of the suspension is shown in FIGS. 3a–b, the other half being located as a duplicate on the other side of the vehicle, the two halves being connected by axle 75.

Upper and lower control arms 65 and 67 have first and second ends, and are of substantially the same length. The first ends of the upper and lower control arms 65 and 67 are pivotally attached to the frame bracket 61 at pivot points 69. The second ends of the upper and lower control arms are pivotally attached at pivot points 73 to an axle seat 71 which has an axle 75 mounted thereon. The upper and lower control arms 65 and 67, the frame bracket 61, and the axle seat 71 are all pivotally connected to one another thereby forming a parallelogram arrangement. In this particular type of parallelogram construction, as shown, the upper and lower control arms 65 and 67 remain substantially parallel to one another at all times.

Appendages 77 are fixedly attached to each of the control arms. Bi-directional expanding and contracting air bellows 79 is located between the appendages 77 and has substantially parallel opposite end plates 81 and 83 contacting the appendages 77. The appendages 77 extend in a direction substantially perpendicular to the longitudinal axis of the air bellows 79. A coil spring, or other bi-directional expansion and contraction means may be used in place of air bellows 79 if desired.

As can be seen when bi-directional air bellows 79 is inflated, it applies a substantially equal but opposite bi-directional force on the opposing appendages 77 and thus moves the control arms via both appendages 77. As shown in FIG. 3a, these bi-directional forces exerted in substantially opposite directions by the air bellows (or air spring) causes the upper and lower control arms to lift, which results in axle 75 and wheels (not shown) attached thereto being lifted out of engagement with the road surface.

The term "bi-directional" is used herein to mean that the bellows expands (or contracts) in two linearly substantially opposite directions thus dividing the lifting (and lowering) forces of the bellows between the upper and lower control arms.

A typical air spring 85 is connected to the axle seat 71 so as to buffer axle vibration and articulation forces during road engagement of the wheels when lowered into road engagement as well as to downwardly bias the axle and wheels attached thereto and hold them appropriately into road engagement so that the suspension when so lowered carries its intended share of the vehicle load as may be required for safety or highway weight laws. The amount of air to be applied, automatically to these bellows for this purpose is well-known in the art. Air spring 85 is attached to the chassis of the vehicle by an air spring bag mount 89.

The advantages of the different embodiments of the parallelogram lift axle suspension of this invention are as follows. The bi-directional expanding and contracting bellows 79 allows for the various embodiments of this invention to utilize smaller lifting air bellows and smaller lower control arms than would normally have to be employed, because the lifting forces of the bellows 79 are about equally distributed between the upper and lower control arms. Furthermore, air bellows 79 is not located in the frame hanger bracket as in the prior art and therefore the hanger bracket 61 can be made smaller, lighter and more cost effective. Another advantage is that during the lifting and lowering of the axle caused by expansion or deflation of the air bellows 79, the air bellows ends or end plates 81 and 83 remain substantially parallel to one another thus eliminating any significant accordion effect and maximizing the lifting power and efficiency of the air bellows. The fact that the air bellows end plates 81 and 83 remain substantially parallel during the bi-directional expansion and contraction of the air bellows 79 also extends the life of the air spring as discussed above and allows for a smaller air bellows to be used. The lift axle suspension system of the present invention is simplified, durability is maximized, and maintenance is minimized.

Figure 4:
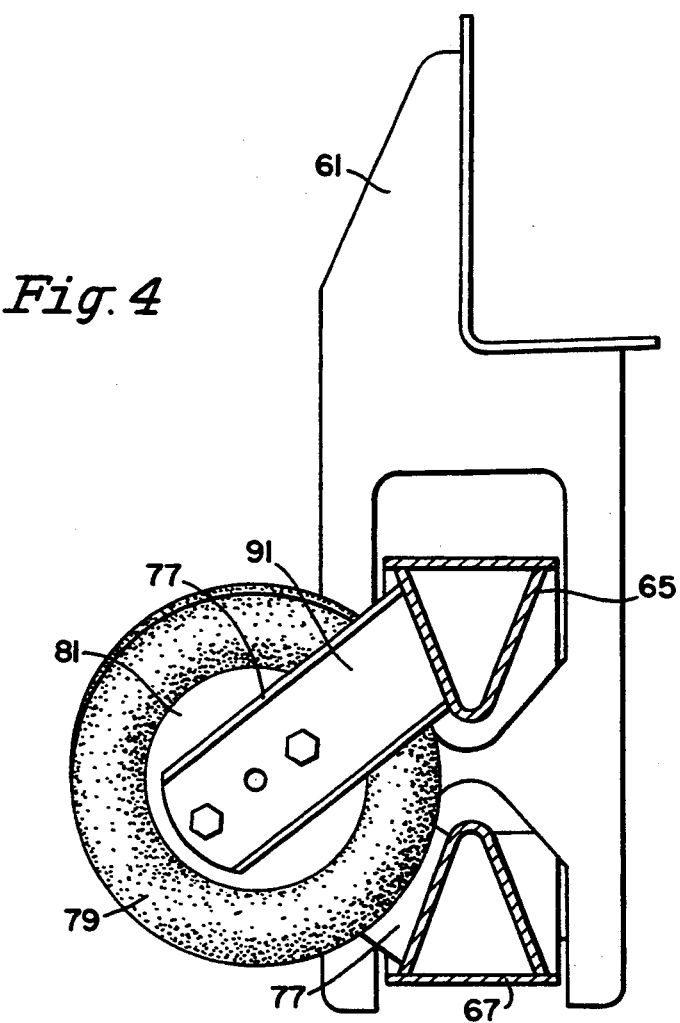
FIG. 4 is a cross-sectional view along A—A of the embodiment of FIGS. 3a and 3b.

FIG. 4 is a cross-sectional view across line A—A shown in FIG. 3b. FIG. 4 illustrates the triangular cross-sectional design of the upper and lower control arms 65 and 67 which allows the bi-directional air bellows 79 to be mounted in very close proximity to the control arms. This triangular cross-sectional design provides for a more compact suspension system and allows for additional mounting space for other vehicle componentry. Because the air bellows 79 are in such close proximity to the control arms 65 and 67, the bending moment stresses in the control arms are also minimized. Such minimization of bending moment stress lengthens the life expectancy of the components therein.

FIG. 4 also illustrates planar surface 91 of the appendages 77 and shows the planar surface 91 of the appendages fixedly mounted to both the air bellows end plates 81 and 83, and the control arms 65 and 67. The appendages 77 may be attached to the control arms and the end plates using bolts, welds, or the like. The appendages may also be integrally formed with the control arms and/or the air spring end plates so as to simplify construction.

Figure 5A:
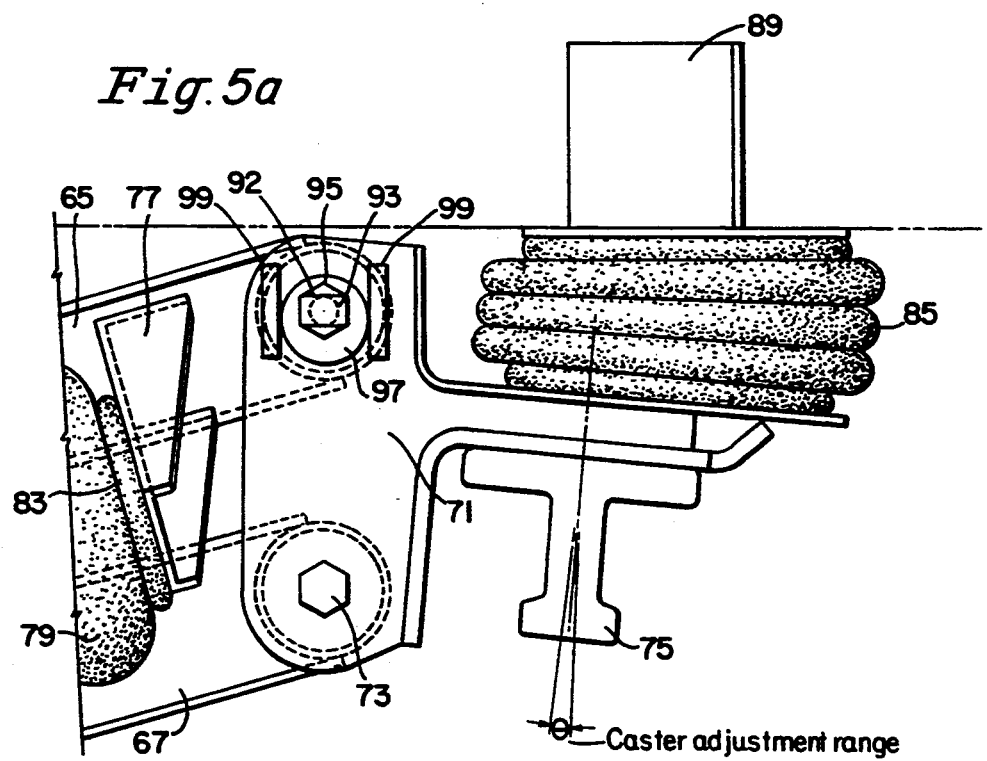
FIGS. 5a–5d are side plan views of the eccentric cam mechanism of the instant invention.

FIG. 5a is a closeup view of the axle seat end of the upper and lower control arms 65 and 67. The axle seat end of the upper control arm 65 is pivotally attached to the axle seat 71 with a bolt having a bolt shaft 93 and a bolt head 95. The bolt is provided with an eccentric cam 97 built into or attached to the bolt head 95. The eccentric cam 97 enables one to adjust the caster or pitch of the axle 75 as needed. As the eccentric cam head 97 is turned, the shaft 93 of the bolt moves fore and aft in a slot 92 formed in the axle seat 71. The net effect of this eccentric cam and slot arrangement is to change the caster (or pitch) of the axle 75 without changing the length of the upper control arm or any of the four links that make up the parallelogram, thus enabling one to change the caster angle by an amount $\phi$, while maintaining a substantially perfect parallelogram. When the cam 97 is turned, parallel cam contact members 99, which are attached to the axle seat 71, are forced fore or aft thereby moving the axle seat 71 and altering the caster of the axle in the range indicated by the angle $\phi$. The angle $\phi$ illustrates how much one may adjust the caster of the axle through the cam adjustment mechanism. Optionally, the eccentric cam could be provided on the lower control arm instead of the upper control arm to achieve a similar result. The size of the cam and length of the slot dictate how much the caster of the axle may be adjusted.

It is desirable in most situations to maintain the axle 75 at approximately a 5° forward pitch or 85° caster so that the vehicle will effectively self steer when driven in a forward direction. This desired caster is shown in FIG. 5c where the 5° forward pitch is equivalent to an 85° caster or 85° angle with respect to the horizontal. When the need to adjust the caster angle arises, one may simply turn the bolt head 95 to simply and effectively alter the caster or pitch of the axle 75.

Figure 5B:
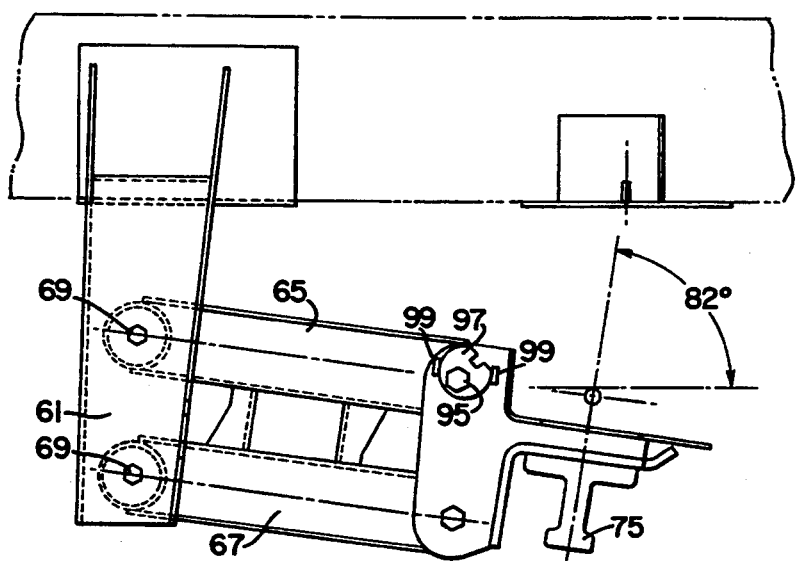
Figure 5C:
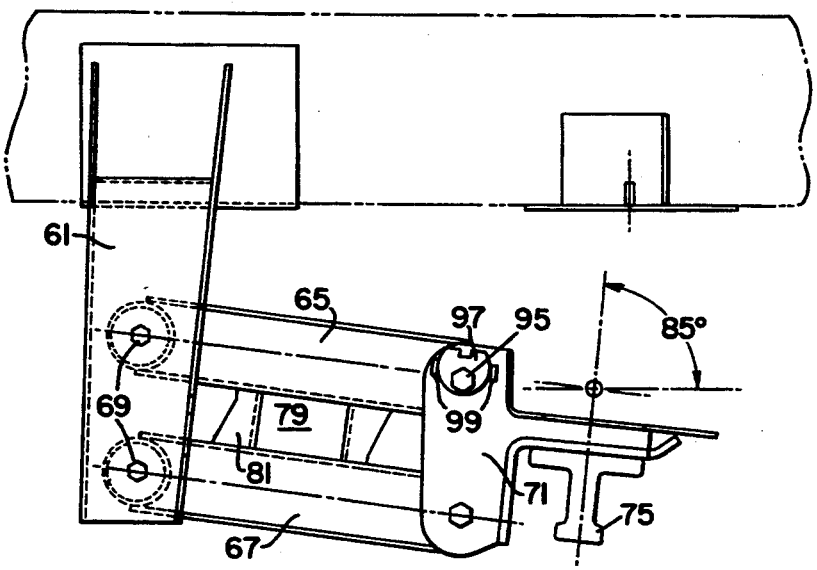

FIG. 5b shows the cam bolt 95 turned clockwise from the "zeroed up" or neutral position of FIG. 5c. The result of this clockwise rotation of bolt 95 and cam 97 is that the caster changes from 85° to 82°.

Figure 5D:
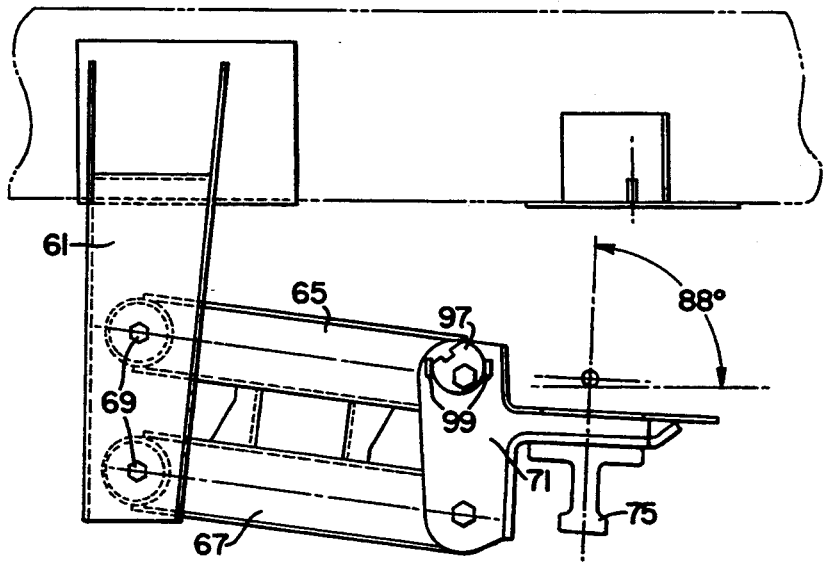

FIG. 5d shows the bolt 95 and cam 97 having been rotated in a counterclockwise position from the position shown in FIG. 5c. The result of this counterclockwise rotation is an adjusted axle caster of 88°. The size of the cam and the extent of rotation determines the amount of axle caster adjustment. The axle caster adjustment mechanism as described above would easily adapt to use with an axle having either a forward or reverse pitch.

The caster (or pitch) of the axle 75 remains substantially constant during raising and lowering of the axle 75 because of the parallelogram nature of the lift axle suspension (the control arms remain substantially parallel). The above discussed caster adjustment mechanism is a significant improvement over that of the prior art in that it is simpler, requires less maintenance, requires fewer parts, does not cause a loss of paralleloism, and is easier to install and adjust.

Figure 6A:
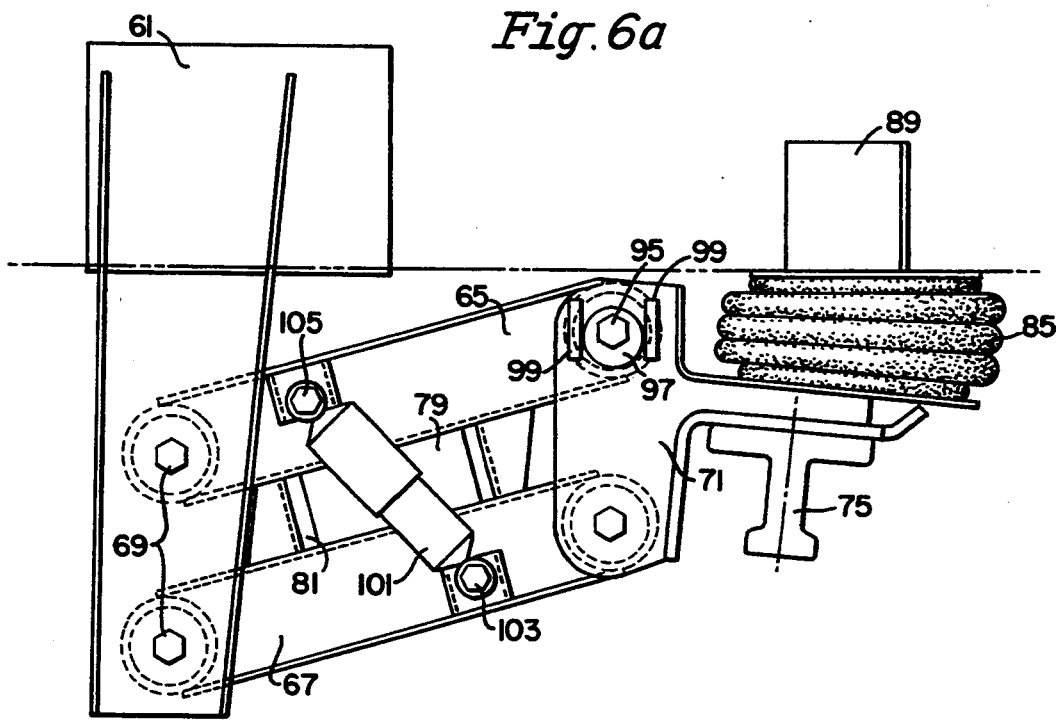
FIGS. 6a and 6b are side plan, partially sectionalized views of a second embodiment of this invention.
Figure 6B:
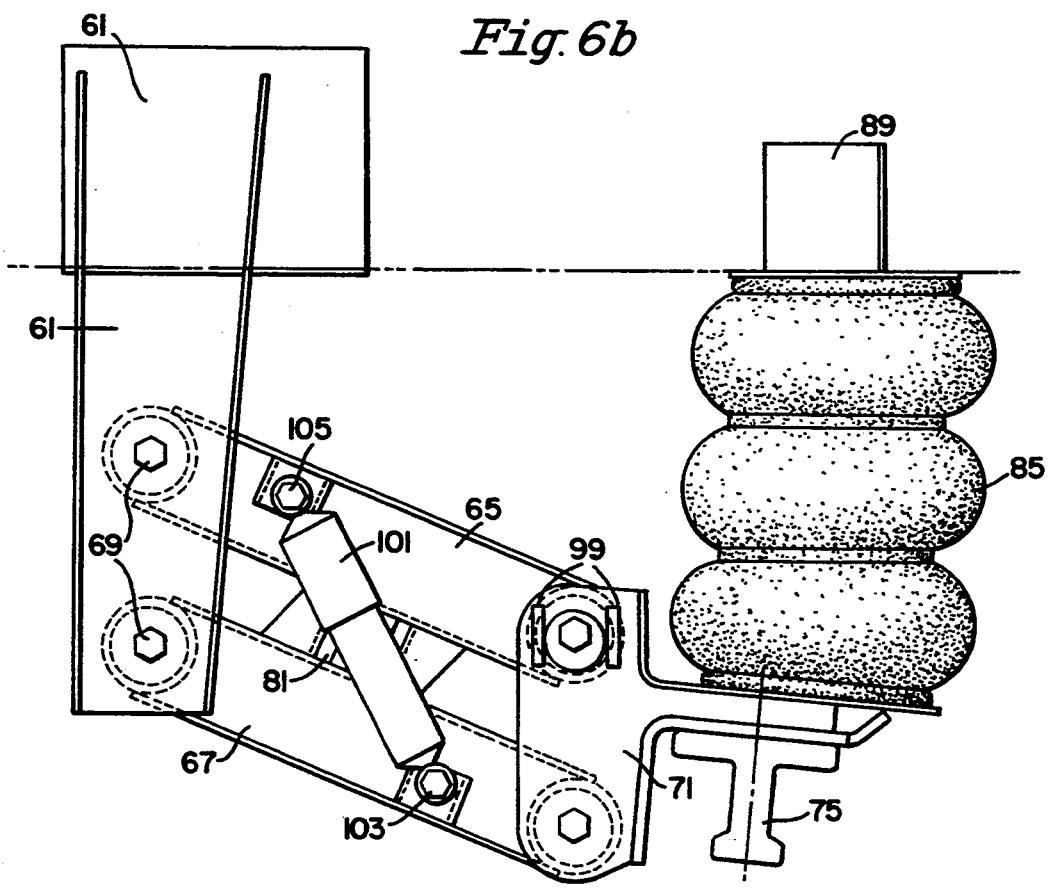

FIGS. 6a and 6b illustrate a second embodiment of the present invention. This embodiment is similar to that shown and described in FIGS. 3-5 except that a shock absorber 101 is pivotally attached to both the upper and lower control arms 65 and 67. In this second embodiment, the bi-directional expanding and contracting air bellows 79 is mounted inboard of the suspension, thus allowing an area outboard of the suspension for shock absorber installation. The shock absorbers 101 are positioned forward of the axles 75 such that their lower ends are attached directly to the lower control arms 67 at pivot points 103, and their upper ends are directly connected to the upper control arms 65 at pivot points 105.

The location of the shock absorbers 101 in this embodiment, forward of the axle, is an improvement over the prior art. This location combined with attaching the shock absorber 101 to the upper and lower control arms, minimizes shock travel and maximizes shock life. The shock absorber location and attachment elements of the present invention are simpler, weigh less, and cheaper to produce than those of the prior art. Another advantage is that the upper and lower shock attachments are prelocated, thereby eliminating the possibility of mis-location. Also, the location of the shock absorber in this embodiment minimizes suspension packaging space thereby allowing for more space beneath the vehicle chassis for other vehicle componentry. Furthermore, because the shock absorbers are directly attached to the upper and lower control arms, the weight, length and costs of the shock absorbers themselves are minimized.

FIG. 7 illustrates a three-dimensional view of the embodiment shown in FIGS. 6a and 6b. As shown in FIG. 7, frame brackets 61, at the forward end of the suspension, are both adapted to be connected to vehicle chassis side rail frame members 63, and the shock absorbers 101 and bi-directional air bellows 79 are located on opposite sides of each control arm 65 and 67. The axle 75 is connected to the axle seat 71 and is adapted to receive one or more wheels at both ends thereof. The axle 75 may be connected to the axle seat 71 using bolts, welds or any other suitable means. As can be seen in FIG. 7, the biasing air springs 85 are also attached to the vehicle chassis side rail frame members 63 via mount 89.

FIGS. 8a and 8b illustrate a wheeled vehicle 107 (e.g. a semi-trailer or rear of a heavy duty truck) equipped with the suspension of an embodiment (e.g. FIGS. 3-7) of the present invention. The wheeled vehicle 107 includes at least two non-liftable wheel bearing suspensions and wheels 109 attached thereto. These nonliftable wheel bearing suspensions provide the primary means of support for road engagement of the vehicle. The wheeled vehicle is also equipped with the lift axle suspension system of an embodiment of the present invention and wheels 111 attached thereto. FIGS. 8a and 8b illustrate the wheels (111 and 109) of both the lift axle suspension system and the fixed non-liftable axle suspension system mounted on the wheeled vehicle 107. FIG. 8a illustrates the lift axle suspension and wheels 111 attached thereto in the raised position with the wheels 111 lifted out of engagement with the road surface 113. FIG. 8b illustrates the lift axle suspension system of the present invention in the lowered position with the wheels 111 engaged with the road surface. The wheels 111 shown in FIG. 8 are connected to the axle 75 shown and described above.

When bi-directional air bellows 79 is inflated, the upper and lower control arms are caused to lift which results in the wheels 111 being lifted out of engagement with the road surface. Likewise, when bellows 79 is deflated, the control arms are caused to lower due to the force of air spring 85, resulting in the wheels 111 being engaged with the road surface as shown in FIG. 11b.

It will be clear to one skilled in the art that the various elements which make up the lift axle suspension systems outlined herein may be connected to one another in tandem form, if desired, using any suitable means, and may be made of any suitable materials.

Once given the above disclosure many other features, modifications and improvements will become apparent to the skilled artisan. Such other features, modifications and improvements are therefore considered to be a part of this invention, the scope of which is to be determined by the following claims:

We claim:

1. In a wheel bearing, lift axle suspension system for a wheeled vehicle which includes at least two non-liftable wheel bearing suspensions providing the primary means of support for road engagement of said vehicle, the lift axle suspension system comprising a frame bracket, upper and lower control arms having first ends pivotally attached to said frame bracket at pivot points and second ends attached to an axle connection means, and means for raising and lowering said wheels of said lift axle suspension into and out of engagement with the road surface, the improvement comprises:

said means for raising said wheels out of engagement with the road surface including bi-directional expansion and contraction means having first and second ends defined by a plate means at each said end, said plate means being attached to said control arms in such a manner and being so located such that when said bi-directional means are expanded and contracted, said plate means remain substantially parallel, one with respect to the other, when said wheels of said lift axle suspension are lowered into and lifted out of engagement with the road surface.

2. The system of claim 1 wherein said plate means move about equally in said opposite directions so as to about equally distribute expansion forces of said expansion means between said upper and lower control arms.

3. The system of claim 1 wherein said control arms have a triangular cross-sectional shape.

4. The system of claim 1 wherein the upper and lower control arms are pivotally connected to said axle connection means.

5. The system of claim 1 wherein the upper and lower control arms remain substantially parallel to one another during said expansion and contraction of said air bellows.

6. The system of claim 5 wherein an axle is mounted on said axle seat.

7. The system of claim 6 wherein each appendage includes a planar surface attached to both of one of said plate means and one of said control arms.

8. The system of claim 1, wherein said axle connection means includes an axle seat adapted to receive an axle mounted thereon.

9. The system of claim 1 wherein said air bellows are attached to said control arms by at least two appendages which are fixedly connected to both the control arms and the air bellows.

10. The system of claim 1, further comprising a shock absorber having first and second ends wherein said first end is connected to said upper control arm and said second end is connected to said lower control arm.

11. The system of claim 10 wherein the cam means further comprises opposing cam contact members located on opposite sides of said cam means and attached to said axle connection means.

12. The system of claim 1 wherein one of said control arms is attached to said axle connection means by an eccentric cam means whereby said cam means may be adjusted so as to alter the caster angle of an axle to be attached to said axle connection means.

13. The system of claim 1 wherein said air bellows is entirely positioned between said axle connection means and said pivot points during said bi-directional expansion and contraction of said air bellows.

14. The system of claim 1 further comprising a biasing air spring attached between a top surface of said axle connection means and a longitudinally extending frame member of said vehicle.

15. A wheeled vehicle having a primary axle as a primary means of support and having mounted thereon the lift axle suspension system of claim 1, and wherein wheels are attached to said axle connection means by an axle.

16. The system of claim 1, wherein the bi-directional means are expandable and contractable air bellows operated off of an air system of the vehicle.

17. The system of claim 1, wherein said means for lowering the wheels of said suspension into road engagement includes another air bellows means, which upon deflation of the lifting air bellows, lowers the wheels into road engagement.

18. The system of claim 1, wherein said end plate means includes an end plate at each end of said bi-directional means and wherein each of said end plates expand and contract a substantially equal distance in their respective longitudinal directions.

19. An axle suspension system for a wheeled vehicle, comprising:
a downwardly extending frame bracket;
upper and lower control arms each having first and second ends, and wherein said first ends of said upper and lower control arms are pivotally attached to said frame bracket;
an axle connection means attached to said second ends of said upper and lower control arms;
expansion means for simultaneously pivoting said upper and lower control arms with respect to said frame bracket thereby raising and lowering said axle connection means; and
a shock absorber having first and second ends, wherein said first end is attached to said upper control arm and said second end is attached to said lower control arm.

20. The system of claim 19 wherein said upper and lower control arms remain substantially parallel when said control arms are pivoted with respect to said frame bracket.

21. The system of claim 19 wherein said means for simultaneously pivoting said control arms comprises a bi-directional expanding and contracting air bellows having first and second ends each defined by a plate means, wherein said plate means remain substantially parallel to one another during bi-directional expansion and contraction of said air bellows.

22. The system of claim 21 wherein said shock absorber is pivotally attached to said upper and lower control arms.

23. The system of claim 19 wherein one of said control arms is attached to said axle connection means with an eccentric cam wherein said eccentric cam includes means for adjusting the caster of an axle attached to said axle connection means.

24. An axle suspension system for a wheeled vehicle, comprising:
upper and lower control arms which move in conjunction with one another thereby raising and lowering an axle seat;
one of said control arms being connected to said axle seat by an eccentric cam; and
wherein said eccentric cam includes a means for changing the caster angle of an axle to be attached to said axle seat.

25. The system of claim 24 wherein said control arms are pivotally connected to said axle seat.

26. The system of claim 24 wherein said control arms are pivotally connected to a downwardly extending frame bracket at pivot points.

27. The system of claim 26 wherein an axle is connected to said axle seat and wheels are attached to said axle.

28. The system of claim 24 wherein said eccentric cam is attached to a bolt wherein the bolt is slidably mounted in a slot formed in the axle seat.

29. The system of claim 28 wherein the means for changing the caster angle further comprises opposing cam contact members located on opposite sides of said cam.

30. The system of claim 24, further comprising a shock absorber which is pivotally mounted to the upper and lower control arms.

31. The system of claim 30 further including a bi-directional expansion means which expands and contracts for raising and lowering said control arms and pivoting said control arms about said pivot points, wherein said bi-directional expansion means has first and second ends defined by a plate means at each end, said plate means move in opposite directions and remain substantially parallel to one another when said expansion means expands and contracts.

32. The system of claim 31, wherein said expansion means includes an air bellows, and said plate means move about equally in said opposite directions so as to about equally distribute expansion forces of said expansion means between said upper and lower control arms.

* * * * *

UNITED STATES PATENT AND TRADEMARK OFFICE
CERTIFICATE OF CORRECTION

PATENT NO. : 5,403,031
DATED : April 4, 1995
INVENTOR(S) : Michael J. Gottschalk, et al.

It is certified that error appears in the above-indentified patent and that said Letters Patent is hereby corrected as shown below:

In col. 10, lines 67-68 (claim 5, lines 3-4), "air bellows" is replaced with --bi-directional expansion and contraction means--.

In col. 11, line 2 (claim 6, line 2), "seat" is replaced with --connection means--.

In col. 11, line 3 (claim 7, line 1), after "wherein", --each plate means includes an appendage, and-- is inserted.

In col. 11, line 9 (claim 9, line 1 ), after "said", --bi-directional means includes an-- is inserted.

In col. 11, line 9 (claim 9, line 1), "are" is deleted.

In col. 11, line 27 (claim 13, line 1), "air bellows" is replaced with --bi-directional means--.

In col. 11, line 45 (claim 17, line 3), "another" is deleted.

Signed and Sealed this

First Day of August, 1995

Attest:

BRUCE LEHMAN

*Attesting Officer*  *Commissioner of Patents and Trademarks*